June 21, 1949.                J. W. DAWSON                2,473,576
                             WELDING SYSTEM
                           Filed June 2, 1945
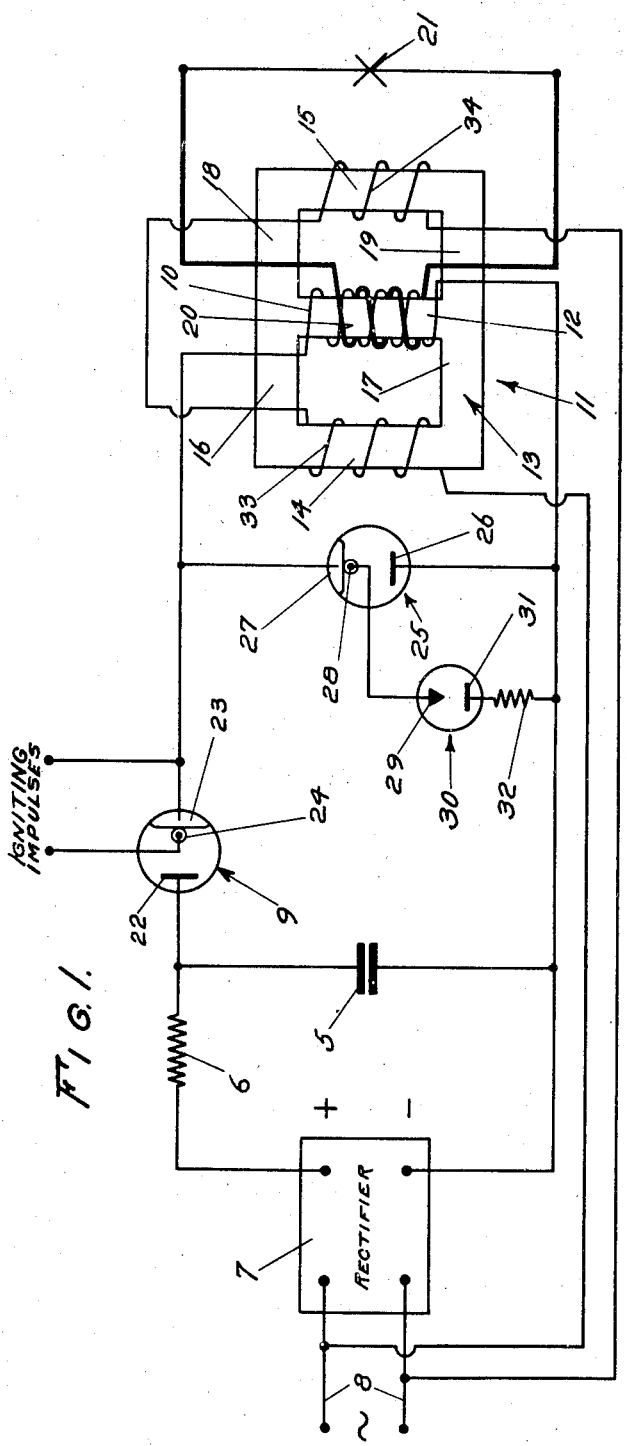
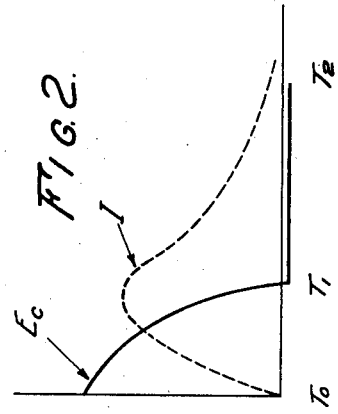
INVENTOR.
JOHN W. DAWSON,
BY Elmer J. Gorn
                ATTY.

Patented June 21, 1949

2,473,576

UNITED STATES PATENT OFFICE 2,473,576

WELDING SYSTEM

John W. Dawson, West Newton, Mass., assignor to Raytheon Manufacturing Company, Newton, Mass., a corporation of Delaware Application June 2, 1945, Serial No. 597,249

6 Claims. (Cl. 323—58)

1

My present invention relates to resistance-welding systems, and more particularly to systems of the general character indicated in which the welding energy has a substantial direct-current component.

Such a system may comprise, for example, a capacitor, means for charging said capacitor, means for discharging said capacitor with a substantially unidirectional current pulse, and a load circuit receptive of said current pulse, said load circuit including a welding transformer having its primary winding connected across said capacitor, and its secondary winding connected across the work to be welded.

Due to the direct-current component of the discharge current in such a system, each welding pulse leaves the core of the welding transformer with a certain amount of residual magnetism, and, eventually, said core becomes saturated, and the system inoperative.

It is, therefore, one of the objects of my present invention to prevent magnetic saturation in a system such as has been described.

It is another object of my present invention to accomplish the foregoing without distorting the shape of the welding current pulse.

These, and other objects of my present invention, which will become more apparent as the detailed description thereof progresses, are attained, briefly, in the following manner:

In the welding system of my present invention I employ a transformer of special design. It includes a core having three legs, all connected in parallel. Primary and secondary coils are wound upon the central leg, and series-connected tertiary coils are wound, respectively, upon the two outer legs. The primary winding is connected into the discharge circuit of the system; the secondary winding is connected across the welding load; and the tertiary windings are connected to a source of alternating current.

As will be hereinafter more fully pointed out, the magnetic circuit for the alternating flux created by said alternating current does not include the leg of the transformer core upon which the primary and secondary coils are wound, so that said flux has no effect upon the welding current. However, the magnetic circuits for the unidirectional flux created by said welding current do include the two legs of the transformer core upon which the tertiary coils are wound, so that the alternating flux created by the alternating current flowing through said tertiary coils shakes out any residual magnetism remaining in said core as a result of the welding pulses.

2

In the accompanying specification I shall describe, and in the annexed drawing show, an illustrative embodiment of the welding system of my present invention. It is, however, to be clearly understood that I do not wish to be limited to the details herein shown and described for purposes of illustration only, inasmuch as changes therein may be made without the exercise of invention and within the true spirit and scope of the claims hereto appended.

In said drawing:

Fig. 1 is a circuit diagram of a welding system assembled in accordance with the principles of my present invention; and Fig. 2 is a graph showing the current-voltage relations in such a system.

Referring now more in detail to the aforesaid illustrative embodiment of my present invention, and with particular reference to the drawing illustrating the same, the numeral 5 designates a capacitor for storing the energy to be utilized in the welding process. Said capacitor is connected, through a current-limiting resistor 6, to a suitable source of direct current for charging the same, for example, to a rectifier 7 connected across a 60-cycle alternating-current line 8.

The output of the capacitor 5 is adapted to be applied, through a normally non-conducting, controlled-ignition discharge tube 9, to the primary coil 10 of a welding transformer 11, said coil being wound upon the central leg 12 of a transformer core 13, which also includes two outer legs 14 and 15 connected in parallel with the central leg 12 by side members 16—19 inclusive. The core comprises, in general, an outer frame and a shunt member bridging said frame. There is also wound upon the central leg 12 a secondary coil 20 adapted to be connected across the work to be welded, herein schematically designated by the reference character 21.

The tube 9 includes an anode 22 which is connected to the positive terminal of the capacitor 5, a pool cathode 23 which is connected to the primary winding 10, and an igniting electrode 24 which, together with said cathode 23, is connected across any suitable source (not shown) of igniting impulses, whereby, at the will of the operator, the tube 9 may be fired to discharge the capacitor 5 through said winding 10.

In the system as thus far described, the capacitor discharge would be oscillatory, and inasmuch as this is not desired, I connect across the primary winding 10 another normally non-conducting, controlled-ignition discharge tube 25, the anode 26 of this tube being connected to the initially negative terminal of the capacitor 5, the pool cathode 27 thereof being connected to the cathode 23 of the tube 9, and the igniting electrode 28 thereof being connected to the cathode 29 of a normally non-conducting, gas-discharge tube 30. The anode 31 of the latter is returned to the initially negative terminal of the capacitor 5 through a current-limiting resistor 32.

Now, when the tube 9 is fired, the capacitor 5 discharges through the primary winding 10, the discharge current I (see Fig. 2), which is zero at time $T_0$, rapidly rising to a maximum at time $T_1$. At the latter time, the capacitor voltage $E_c$, initially at maximum, drops to zero. As a result of said discharge current, considerable energy is stored in the system, particularly, in the field about the secondary transformer circuit. As this field collapses and gives its energy back to the system, the flow of current I is continued in its original direction, thereby causing the capacitor 5 to recharge with its original polarity reversed. However, before the recharge can become appreciable, the tube 30 becomes conducting, firing the tube 25 and extinguishing the tube 9. The current which would have recharged the capacitor 5 with reversed polarity is, therefore, diverted through the tube 25, and it decays exponentially, as indicated between the times $T_1$ and $T_2$.

The voltage-time integral, as applied to the primary, being unidirectional, there is a substantial direct-current component present which, as stated in earlier portions of this specification, tends to magnetically saturate the core 13 of the transformer 11.

In order to avoid such saturation, I provide the legs 14 and 15 of the core 13 with series-connected tertiary windings 33 and 34 which, in turn, are connected across the alternating-current line 8.

Now, the path of the magnetic flux created by the alternating current flowing through the coils 33 and 34 comprises the leg 14, side members 16 and 18, leg 15 and side members 19 and 17. Said flux does not enter the leg 12, through which it would have to flow in opposition from opposite ends. Therefore, being excluded from the region of the core 13 in which the transformer action between the primary and secondary windings 10 and 20 occurs, it does not affect the welding current.

However, the paths of the magnetic flux created by the capacitor discharge current flowing through the primary winding 10 comprise, in one direction, the leg 12, side member 18, leg 15 and side member 19, and in the other direction, the leg 12, side member 16, leg 14 and side member 17. These paths include considerable portions of the above-described path of the alternating flux created by the alternating current flowing through the tertiary coils 33 and 34. Hence, any residual flux remaining in the core 13 as a result of the unidirectional welding current is shaken out, and magnetic saturation is thereby avoided.

This completes the description of the aforesaid illustrative embodiment of my present invention.

It will be noted from all of the foregoing that I have provided a resistance-welding system of the type in which the welding current has a substantial direct-current component, in which magnetic saturation of the welding transformer is prevented. It will be further noted that I accomplish this highly desirable result without in any way altering any of the characteristics of the welding current.

Other advantages of my present invention will readily occur to those skilled in the art to which the same relates.

What is claimed is:

1. In a welding system: means for producing a current pulse having a substantial direct-current component; a load circuit adapted to be energized by said current pulse; said load circuit including a transformer having a core comprising a frame portion, and a shunt portion bridging said frame portion whereby said core defines a plurality of magnetic paths; said shunt portion being provided with a primary winding connected across said current-producing means to establish unidirectional fluxes through magnetic paths including said shunt portion and said frame portion and a secondary winding superimposed on said primary winding and adapted to be connected across a resistance-welding load; said frame portion being provided with a tertiary winding adapted to be connected across a source of alternating current to establish alternating fluxes through magnetc paths including said frame portion but excluding said shunt portion.

2. In a welding system: means for producing a current pulse having a substantial direct-current component; a load circuit adapted to be energized by said current pulse; said load circuit including a transformer having a core comprising a central and two outer leg members connected in parallel by a plurality of side members whereby said core defines a plurality of magnetic paths; said central leg member being provided with a primary winding connected across said current-producing means to establish unidirectional fluxes through magnetic paths including said central leg member, said outer leg members, and said side members; and a secondary winding superimposed on a said winding and adapted to be connected across a resistance-welding load; said outer leg members being provided with series-connected tertiary windings adapted to be connected across a source of alternating current to establish alternating fluxes through magnetic paths including said outer leg members and said side members but excluding said central leg member.

3. In a welding system: a capacitor; means for charging said capacitor; means for discharging said capacitor with a current pulse having a substantial direct-current component; a load circuit adapted to be energized by said discharge current; said load circuit including a transformer having a core comprising a frame portion, and a shunt portion bridging said frame portion whereby said core defines a plurality of magnetic paths; said shunt portion being provided with a primary winding connected across said capacitor to establish unidirectional fluxes through magnetic paths including said shunt portion and said frame portion and a secondary winding superimposed on said primary winding and adapted to be connected across a resistance-welding load; said frame portion being provided with a tertiary winding adapted to be connected across a source of alternating current to establish alternating fluxes through magnetic paths including said frame portion but excluding said shunt portion.

4. In a welding system: a capacitor; means for charging said capacitor; means for discharging said capacitor with a current pulse having a substantial direct-current component; a load circuit adapted to be energized by said discharge current; said load circuit including a transformer having a core comprising a central and two outer leg members connected in parallel by a plurality of side members whereby said core defines a plurality of magnetic paths; said central leg member being provided with a primary winding connected across said capacitor to establish unidirectional fluxes through magnetic paths including said central leg member, said outer leg members, and said side members; and a secondary winding superimposed on said primary winding and adapted to be connected across a resistance-welding load; said outer leg members being provided with series-connected tertiary windings adapted to be connected across a source of alternating current to establish alternating fluxes through magnetic paths including said outer leg members and said side members but excluding said central leg member.

5. A welding system comprising: means for producing a current pulse having a substantial direct-current component; a load circuit adapted to be energized by said current pulse; said load circuit including a transformer having a core comprising a frame portion and a shunt portion bridging the same; a primary winding carried by said shunt portion and connected across said pulse-producing means to establish unidirectional fluxes through said shunt and frame portions; a secondary winding superimposed on said primary winding and adapted to be connected across a welding load; and a pair of series-connected tertiary windings carried by said frame portion and adapted to be connected to a source of alternating current to establish opposed alternating fluxes of equal intensity across said shunt portion.

6. A welding system comprising: a source of current pulses having a substantial direct-current component; a transformer having a core including a frame portion and a shunt portion bridging the same; a primary winding carried by said shunt portion and connected across said current pulse source to establish unidirectional magnetic fluxes through said shunt and frame portions; a secondary winding superimposed on said primary winding and adapted to be connected across a welding load; and a tertiary winding carried by said frame portion and adapted to be connected to a source of alternating current to establish opposed alternating fluxes of equal intensity across said shunt portion.

JOHN W. DAWSON.

REFERENCES CITED

The following references are of record in the file of this patent:

UNITED STATES PATENTS

| Number | Name | Date |
|---|---|---|
| 1,968,346 | Neiss | July 31, 1934 |
| 2,390,774 | Burgwin | Dec. 11, 1945 |

Certificate of Correction

Patent No. 2,473,576.  June 21, 1949.

JOHN W. DAWSON

It is hereby certified that errors appear in the printed specification of the above numbered patent requiring correction as follows:

Column 4, lines 19 and 64, after the word "portion" in each occurrence, insert a semi-colon; line 25, for "magnetc" read *magnetic*; lines 42 and 43, for "a said winding" read *said primary winding*;

and that the said Letters Patent should be read with these corrections therein that the same may conform to the record of the case in the Patent Office.

Signed and sealed this 15th day of November, A. D. 1949.

[SEAL]

THOMAS F. MURPHY,
*Assistant Commissioner of Patents.*